June 3, 1952 — L. E. YETTAW — 2,599,422
ATOMIZER
Filed May 27, 1948 — 2 SHEETS—SHEET 1
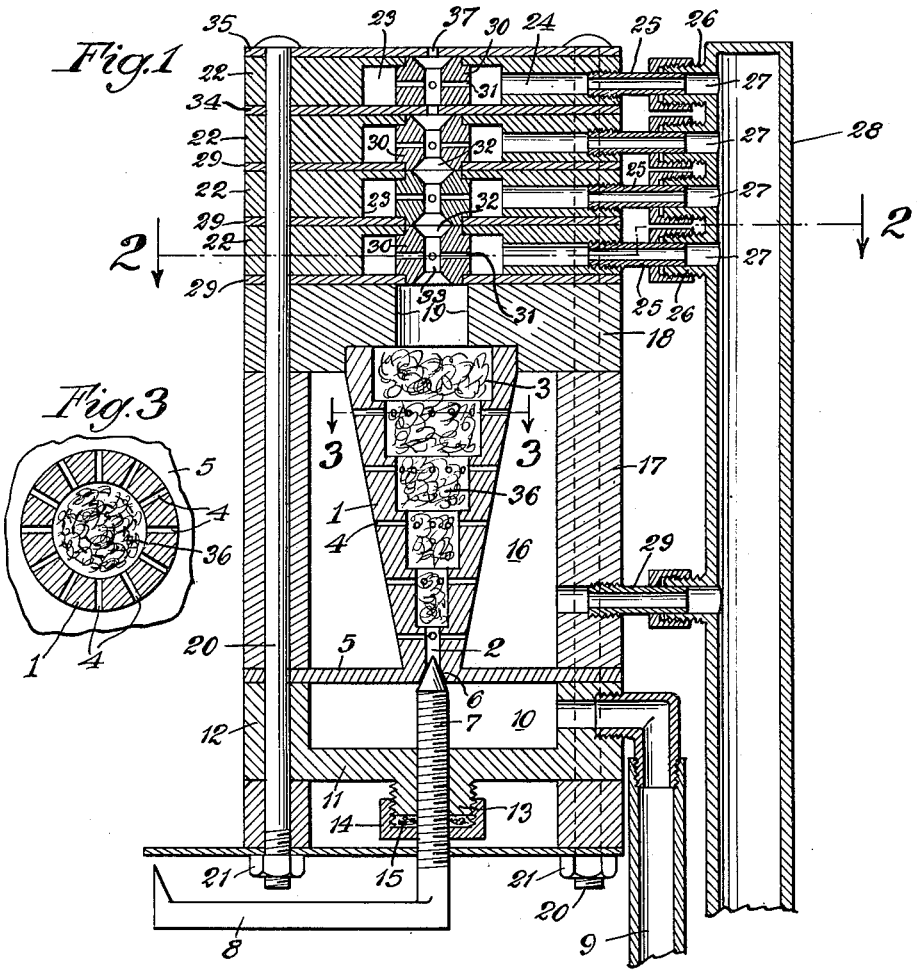
Fig.1
Fig.3
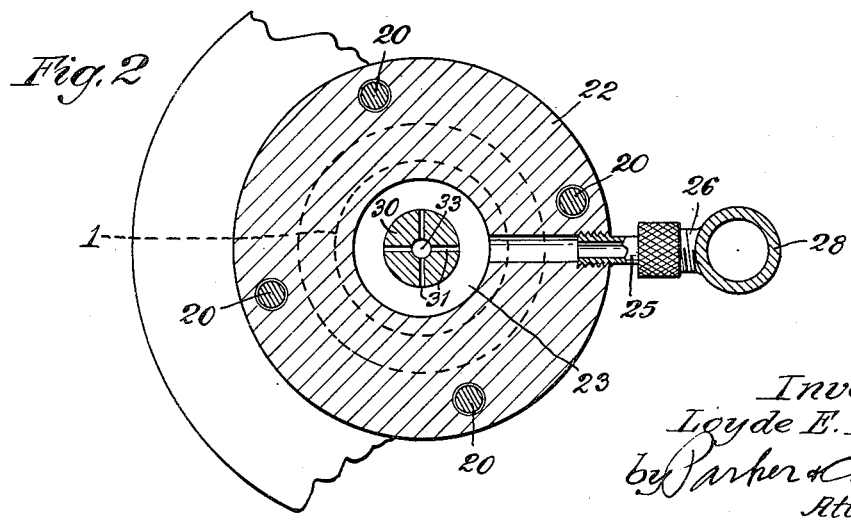
Fig.2
Inventor
Loyde E. Yettaw
by Parker & Carter
Attorneys

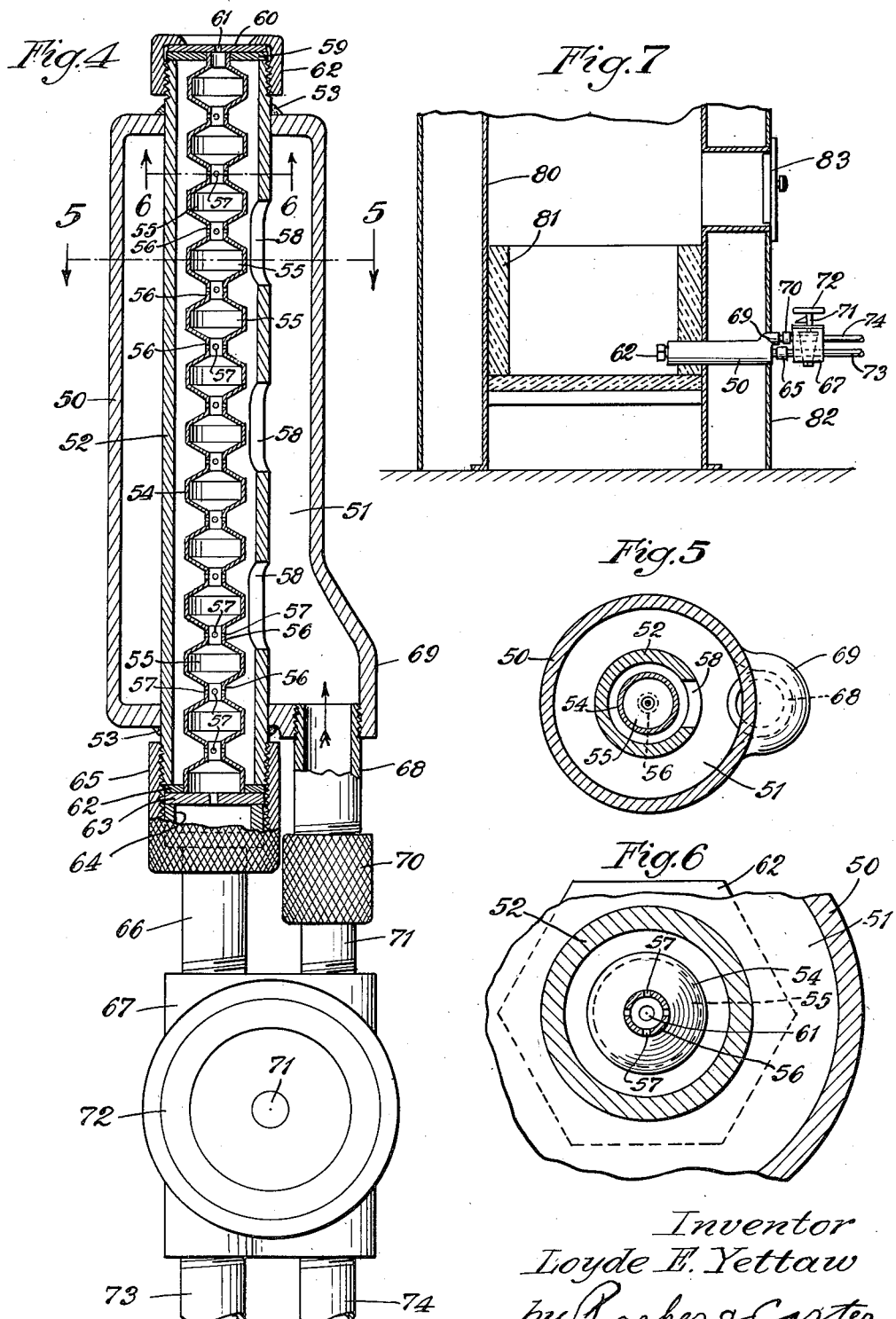

Patented June 3, 1952

2,599,422

UNITED STATES PATENT OFFICE 2,599,422

ATOMIZER

Loyde E. Yettaw, Maywood, Ill.

Application May 27, 1948, Serial No. 29,503

6 Claims. (Cl. 299—140)

My invention relates to atomizers and has for one object to provide a new and improved type of portable atomizing nozzle which makes it possible without the use of heat to spray and atomize oil mixtures and the like such as are especially well adapted to agricultural purposes, insect control and similar activities.

It is of the utmost importance to atomize insect control solutions such as DDT and the like and to be able to control the size of the droplet and to be able to do so without heating the liquid.

The reasons for this are that if the liquid is heated, its lethal effect on insects or the like is likely to be reduced and sometimes may be altogether destroyed.

If the droplets are too big, they may burn the plants and too big droplets are also wasteful because increase in size of droplet above a predetermined point, does not increase the effect of treatment, decreases the area which may be covered and makes the fogging or air transportation of the atomized droplets ineffective in that it limits the range of the apparatus.

Other reasons will appear from time to time in the course of the specification and claims.

My invention is illustrated more or less diagrammatically in the accompanying drawings, wherein:

Figure 1 illustrates a longitudinal section through an atomizing nozzle;

Figure 2 is a section along the line 2—2 of Figure 1;

Figure 3 is a section along the line 3—3 of Figure 1;

Figure 4 is a longitudinal section through a modified form of my device especially well adapted for portable use;

Figure 5 is a section along the line 5—5 of Figure 4;

Figure 6 is a section along the line 6—6 of Figure 4; and

Figure 7 diagrammatically illustrates the use of either of my nozzles in connection with furnaces and the like.

Like parts are indicated by like characters throughout the specification and drawings.

Referring first to the larger, heavier form of my device shown in Figures 1 to 3 inclusive, 1 is an atomizing cone, the interior diameter of the cone increases by increments, each short section of the cone being interiorly cylindrical. The cylinder increasing in diameter toward the discharge end with the smaller cylinder 2 at the admission end, with the larger cylinder 3 at the discharge end, these cylinders increasing from the small sizes of 2 to the large sizes of 3 by the generally equal increments as indicated.

Air passages 4 are disbursed in the wall of the cone extending from the outside into and communicating with each cylinder. The cylinder has a plate 5 integral with and then extending laterally from the feed end. At the center of this plate is a valve seat 6 adapted to be closed by threaded valve 7 rotatable by handle 8 to control the supply of liquid. The liquid preferably oil, enters through a supply pipe 9 into a chamber 10 and thence through a valve aperture defined by the seat 6. The chamber is formed by the transverse wall 11 and annular flange 12 and is provided with a hub 13 on which is threaded the packing nut 14 to compress the packing gland 15. The cone itself is contained within a chamber 16 enclosed by cylindrical sleeve 17 which abuts at one end on the plate 5, at the other end on the apertured plate 18 in which the discharge end of the atomizing cone is socketed.

Plate 18 is apertured as at 19 in alignment with the axis of the cone, the diameter of the aperture 19 being less than the diameter of the cylindrical chamber 3. These parts are all held together by holding bolts 20 and nuts 21 which bolts also pass through the atomizing plates now to be described.

22 indicates a series of apertured plates held together against the plate 18 by the bolts 20. Each plate is centrally apertured as at 23. Each aperture communicates with a radial passage 24 which radial passage is connected to a pipe 25 which in turn is connected to a sleeve 26 and each sleeve is centrally apertured at 27 to communicate with a plenum chamber 28. A pipe 29 leads from the plenum chamber 28 to the chamber 16. Air under pressure may be admitted to the plenum chamber 28 in any suitable way so that while oil passes in at the apex of the cone and thence longitudinally of the apertures, air is admitted radially at a number of points.

Associated with the plates 18 and 22 and spacing them apart are a series of filler plates 29. These filler plates are apertured, the diameter of the apertures being somewhat less than the aperture 23 and the filler plates position within the apertures 23 a series of atomizing blocks 30. These atomizing blocks are centrally apertured. They contain radial air passage 31 connecting the central apertures of the aperture 23 and as indicated, they are chamfered to define a plurality of lenticular chambers 32, the air being admitted to the central apertures 33 between the lenticular chambers 32. The last two plates 34 and 35 are apertured, the diameters being somewhat less than the diameter of the apertures 33.

The interior of the cone 1 including all of the cylindrical chambers is filled with steel wool or the like as indicated at 36.

When oil is introduced under pressure past the valve seat into the cone, it tends to pass down through the conical area and through the steel wool filler. Air also passes in at the same time into the steel wool filler through the radial passages, the oil pressure of course, must be greater than the air pressure. The presence of the steel wool and the meeting of the oil and air streams under pressure tends to initially break down and atomize the oil. This atomized oil then passes out through the alternate cylindrical passages and lenticular passages, more air being supplied between the lenticular chambers. This expansion and contraction of the oil air stream as it passes through the alternate cylindrical and lenticular chambers, breaks the oil into small droplets which are discharged finally as a fog through the final discharge aperture 37.

Referring now to the more portable form shown in Figures 4 to 6 inclusive, the nozzle includes a housing 50 which defines an air chamber 51, a sleeve 52 and extends through the housing from end to end, extending at each end beyond the housing and being sealed or otherwise suitably fastened as at 53 to make an air-tight joint. Within the housing is the atomizing tube 54. The atomizing tube in this case is continuous from end to end and includes a plurality of expanded more or less lenticular chambers 55 joined by relatively restricted or necked down cylindrical tubular passages 56. The walls of the passages 56 are radially apertured as at 57. The wall of the sleeve 52 is apertured at a number of places as at 58. The atomizing tube 54 is held centrally related within the sleeve 52 at the discharge end by the spacing ring 59 apertured to encircle the end of the tube and adapted to rest upon the end of the sleeve 52. The nozzle plate 60 overlies the plate 59 and the nozzle aperture 61 is in alignment with the central axis of the tube. This aperture is of lesser diameter than any of the cylindrical passages 56. A cap 62 is threaded on the end of the sleeve 52 to hold the plate 59, nozzle plate 60 and tube 54 in position at the discharge end of the spray nozzle assembly.

At the rear end, the tube 54 is centered by an apertured spacer plate 62, the aperture being sufficient to encircle the outer, larger diameter of the tube. Engaging the end of the tube and the spacer plate 62 is an apertured plate 63. 64 is a cylindrical coupling member enclosed within the threaded nut 65. The nut 65 is threaded on the rear end of the sleeve 52 and holds the coupling sleeve, apertured plate and positioning plate all in position with relation to the tube 54 in the sleeve 52. The relative lengths of the parts are such that when the nut 65 is screwed home, sufficient pressure is applied to the sleeve 54 to make an air-tight joint at both ends thereof so that air under pressure cannot leak from the interior of the sleeve 52 into the interior of the tube 54 except through the apertures 57. 66 is an air pipe attached to the coupling member 64 and at the other end engaging it air-tight the valve housing 67. 68 is an air pipe threaded in the extension 69 of the housing 50. A coupling 70 joins the pipe 68 with an air pipe 71, which in turn is coupled to the housing 67. 72 is a hand wheel on the valve stem 71. The valve contained within the housing 67 is so arranged that it controls the flow of air and oil, the two valve elements being so disposed that air is admitted first and further valve movement then admits oil after which air and oil are simultaneously admitted and controlled. Oil under pressure reaches the valve housing 67 through the hose 73 and air under pressure reaches it through the hose 74.

Referring to Figure 7, I have shown the device of Figure 4 diagrammatically mounted in a furnace including a housing 80, a fire-brick burning pot 81, outer wall 82, inspection door 83. Obviously either of the two nozzles which I have disclosed might be used in this connection to promote air and oil to atomize fuel in an oil burning furnace.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

The problem of atomizing oils or other liquids in connection with plant spraying and the like is a peculiar one because it is of the utmost importance that the droplets be held to a minimum. Experience teaches that plants may be sprayed with D. D. T. or other insecticides without deleterious effect on the plants when the droplets are all held not to exceed 40 micron size. 40 micron however, is undesirably high and the optimum is sprays of 5 micron. For instance a 5 micron droplet of 5% D. D. T. is a lethal dose for the insects. Anything smaller than that is no good and anything larger than that is wasteful because you are shooting mice with a cannon when you are using more than 5 micron droplets.

When using the spray apparatus to create a fog, the size of the droplet is of the utmost importance because a 20 micron size droplet will fall at the rate of 10 feet in 5 minutes. Thus if the droplets are larger than that, when one is trying to create a fog, most of the fog drops within a very short distance from the nozzle. The smaller the droplet, the lower its rate of fall and the larger the area that can be fogged from one source.

Heretofore most spraying has been done with heat and pressure and this is difficult because it becomes exceedingly important to maintain the temperature below a certain predetermined point. For instance D. D. T. loses its lethal characteristic when it is heated to 600 degrees F. If high pressure steam is used, there is always the danger that the temperature will reach or approach the point at which the aerosol loses its lethal value.

I have found that it is possible by my apparatus to control the size of the droplet and to obtain uniform droplet size without heat and while using relatively low pressures under circumstances such that an operator can handle the spray easily and accurately by manual manipulation.

In using a spray nozzle which comprises a series of expansion chambers wherein air is introduced to the oil or liquid stream between the chambers under pressure, five such chambers using, for instance, oil at 120 pound pressure and air at 100 pound will give three to four gallons per minute of generally homogeneous spray, the droplets of an average 20 microns. If more oil is forced through such a system, we get an occasional gob of oil of very much larger size droplets which is deleterious in that droplets larger than 40 microns burn the plant. If now, we increase the number of these expansion and contraction heads without changing their size and without changing the air and oil pressure merely by increasing the pressure through which the oil is introduced to the spray head, we can with 11 heads get 7 gallons per hour of average 20 micron size droplets with none as big as 40 micron. But again if we try to increase the amount of oil put through this nozzle, we do not get an effective increase in capacity but we do get slugs of over 40 micron size droplets.

When 24 of these heads are used, we can pass through the system 13 gallons an hour of the liquid. The droplets still averaging 20 microns and still remaining, all of them under 40 microns. About 20 percent of five micron size will result. Of course, the higher the percent of 5 micron droplets, the more area we cover and the more effectively we are able to use the expensive lethal compound.

Because the spray nozzle is small and handy, easily manipulated and because no heat is used, it is also practical to use my apparatus as an insecticide and because of the very small size droplets I am able to produce, it becomes possible to drive a machine to the point of use, connect the hose, take the nozzle into the house and fog the whole house without the necessity of actually spraying the walls and contents so that the size of the droplet is of the utmost importance in any type of spraying for insecticide, plant spraying, plant fertilizing or the like and its importance is not specifically limited to plant spraying.

Another advantage of my type of spray nozzle is that there is no starting or stopping drip of unatomized liquid. This makes it especially important in connection with house work, because no drops are left on the carpet and furniture and in connection with plant spraying because no drops are deposited big enough to burn the plants.

While this invention is primarily worked out in connection with lethal sprays, it is a fact that the same atomizer could be used in connection with oil burners where the oil must be atomized for combustion. The very fine droplets, the uniform character of the droplets and the uniform discharge would produce in an oil burner, much the same desirable combustion characteristics that you find in a gas burner. In other words, the mechanical atomization of the oil would present to the flame a uniform homogeneous cloud of gas-like fuel particles especially well adapted to support combustion.

The effect of passing the oil to be atomized first through the sharp shouldered cone of progressively increasing diameter with successive impingements of air jets, at right angles to the direction of travel of the oil, produces an atomizing result. This atomization may be increased by filling the cone with such an interrupter or breaker as steel wool and a certain amount of atomization takes place. This pre-atomized material is then fed through the series of spray heads subjected alternately to the effect of the radial air jets in the constricted throat and to the turbulence resultant from expansion and then contraction between adjacent throats until finally discharge takes place.

There is every indication that this atomization is a progressive operation as the treatment continues from head to head, the oil that has been reduced to globules of small size, tends to so remain but the larger droplets are gradually disintegrated until with suitable pressures and a suitable number of atomizing heads or atomizing chambers through which the oil passes in succession, the droplets are gradually reduced until all of them fall within the desired size range.

In the more portable device illustrated in Figure 4 and following, for convenience I omit the cone and its filler and greatly increase the number of atomizing chambers or heads, increasing that number to the point desired to get the desired result.

Especially in connection with the device of Figure 4, assuming an installation which would include a motor, an air compressor and an oil pump, oil is fed under pressure to the control valve. Air is also fed under pressure to the valve at a somewhat lower pressure. When the operator wishes to use the device, he turns the valve. This first commences to feed air into the housing and air enters the interior of the housing, is distributed by a plenum chamber through the apertures in the sleeve throughout its lengths so that the air pressure from end to end of the outside of the atomizing tube will be substantially constant and air will rush out without oil through the spray nozzle aperture. Further opening of the valve may increase the air supply and admit oil at higher pressure to the system. The oil passes through the atomizing tube, is mixed with air under pressure and as constricted in the tube, the air and oil mixture expands in each supply chamber, is again constricted, receives more air and again expanded until it reaches the discharge point.

By this arrangement, the amount of air associated with the oil increases progressively as the oil travels from the intake to the discharge end of the spray nozzle and this is as it should be because as the droplets gradually decrease in size their surface area gradually increases in proportion to volume and weight and a progressively increasing amount of air is needed to continue and complete the atomization and to mix with the atomized droplets to form the desired aerosol fog.

The atomization is probably the result then of the progressive disintegration and decrease in size of droplets as they are subjected alternately to expansion and contraction and the eddy currents and turbulence resulting therefrom and to the eddy currents and turbulence resulting from the increase in the supply of air to the moving stream of oil and air.

Of course, the reason why the air should pass out first is that otherwise large droplets of oil might be formed at beginning and ending operation. The air stream coming earlier and ending later voids this. The reason why the oil pressure is higher than the air pressure is that otherwise there would be a tendency for the air to back up and prevent introduction of oil to the atomizer.

While I have illustrated my device primarily for use in connection with insect control and the like, and secondarily, in connection with atomization for a burner, it is of course obvious that it might be used under any circumstances where it was desired to atomize oil for fuel as for an engine or any other condition where atomization or breaking down of a liquid was desirable.

I claim:

1. In an atomizer, an atomizing tube including a plurality of expansion chambers, a plurality of cylindrical constricting passages joining them, means for supplying liquid under pressure to one end of the tube, there being an atomizing discharge port communicating with the other end of the tube, means for supplying air under pressure to the cylindrical passages, there being an apertured closure for each end of the tube, the liquid being supplied to the tube through one of the apertures, the atomized liquid being discharged through the other, the apertures in the closures being of lesser diameter than the diameter of the constricting passages.

2. In an atomizer for cold atomization of liquids, an atomizing tube including a plurality of spaced expansion chambers, there being a cylindrical radially apertured constricting passage joining each pair of expansion chambers, a discharge aperture at the discharge end of the atomizing tube, means for supplying liquid to be atomized under pressure above atmospheric to the inlet end of the tube, means for supplying air to the tube through the radial apertures under pressure above atmospheric but less than that of the liquid.

3. In an atomizer for cold atomization of liquids, an atomizing tube including a plurality of spaced expansion chambers, there being a cylindrical radially apertured constricting passage joining each pair of expansion chambers, a discharge aperture at the discharge end of the atomizing tube, means for supplying liquid to be atomized under pressure above atmospheric to the inlet end of the tube, means for supplying air to the tube through the radial apertures under pressure above atmospheric but less than that of the liquid, the discharge aperture being of lesser diameter than the inner diameter of the liquid passages.

4. In an atomizer for cold atomization of liquids, an atomizing tube including a plurality of spaced expansion chambers, there being a cylindrical radially apertured constricting passage joining each pair of expansion chambers, a discharge aperture at the discharge end of the atomizing tube, a supply aperture at the other end of the tube, the diameters of the supply and discharge apertures being less than the inner diameters of the liquid passages, means for supplying liquid to be atomized under pressure above atmospheric to the inlet end of the tube, means for supplying air to the tube through the radial apertures under pressure above atmospheric but less than that of the liquid.

5. In an atomizer for cold atomization of liquids, an atomizing tube comprising a plurality of spaced expansion chambers from five to eleven in number, a cylindrical radially apertured constricting passage joining each pair of expansion chambers, a supply aperture at one end of the tube and a discharge aperture at the other end, means for supplying the liquid to be atomized under a pressure of approximately one hundred-twenty pounds gauge to the tube through the supply aperture and means for supplying air under a pressure of one hundred pounds gauge to the tube through the radial apertures, the discharge aperture being of lesser diameter than the inner diameter of the liquid passages.

6. In an atomizer for cold atomization of liquids, an atomizing tube comprising a plurality of spaced expansion chambers from five to eleven in number, a cylindrical radially apertured constricting passage joining each pair of expansion chambers, a supply aperture at one end of the tube and a discharge aperture at the other end, means for supplying the liquid to be atomized under a pressure of approximately one hundred-twenty pounds gauge to the tube through the supply aperture and means for supplying air under a pressure of one hundred pounds gauge to the tube through the radial apertures.

LOYDE E. YETTAW.

REFERENCES CITED

The following references are of record in the file of this patent:

UNITED STATES PATENTS

| Number | Name | Date |
|---|---|---|
| 872,649 | Foster et al. | Dec. 3, 1907 |
| 1,229,344 | Stevens | June 12, 1917 |
| 1,331,376 | Quinn | Feb. 17, 1920 |
| 1,703,219 | Wold | Feb. 26, 1929 |
| 1,771,530 | Edwards | July 29, 1930 |
| 2,354,151 | Skoglund | July 18, 1944 |

FOREIGN PATENTS

| Number | Country | Date |
|---|---|---|
| 181,774 | Great Britain | June 19, 1922 |